US006831966B1

(12) United States Patent
Tegan et al.

(10) Patent No.: US 6,831,966 B1
(45) Date of Patent: Dec. 14, 2004

(54) MULTI-TENANT, MULTI-MEDIA CALL CENTER SERVICES PLATFORM SYSTEM

(75) Inventors: Earl Tegan, Lakewood, CO (US); Renata Corlett, Lafayette, CO (US); Craig Stevenson, Mesa, AZ (US); Jim Reynolds, Tempe, AZ (US); Karen Siegel-Jacobs, Boulder, CO (US); Terri Ford, Scottsdale, AZ (US)

(73) Assignee: Qwest Communications International, Inc., Denver, CO (US)

( * ) Notice: Subject to any disclaimer, the term of this patent is extended or adjusted under 35 U.S.C. 154(b) by 458 days.

(21) Appl. No.: 09/651,791

(22) Filed: Aug. 30, 2000

Related U.S. Application Data

(60) Provisional application No. 60/215,173, filed on Jun. 30, 2000.

(51) Int. Cl.[7] .................................................. H04M 1/64
(52) U.S. Cl. .............................. 379/88.16; 379/210.01; 379/221.05; 379/265.02; 370/352; 709/217; 705/7; 705/9
(58) Field of Search ...................... 379/207.14, 211.02, 379/220, 9.04, 265.03–265.09, 266.01–266.09, 88.22, 265.12, 210.01, 221.05–221.07, 88.16, 265.02; 370/389, 352; 709/217; 705/7, 10

(56) References Cited

U.S. PATENT DOCUMENTS

| | | | | |
|---|---|---|---|---|
| 5,463,685 A | * | 10/1995 | Gaechter et al. ....... | 379/210.01 |
| 5,479,487 A | * | 12/1995 | Hammond ................ | 379/88.22 |
| 5,790,650 A | * | 8/1998 | Dunn et al. ............. | 379/265.03 |
| 5,867,495 A | * | 2/1999 | Elliott et al. ................. | 370/352 |
| 5,901,214 A | * | 5/1999 | Shaffer et al. .......... | 379/211.02 |
| 6,249,809 B1 | * | 6/2001 | Bro ............................ | 709/217 |
| 6,408,066 B1 | * | 6/2002 | Andruska et al. ....... | 379/265.12 |
| 6,430,271 B1 | * | 8/2002 | DeJesus et al. .......... | 379/88.22 |
| 6,459,788 B1 | * | 10/2002 | Khuc et al. ............. | 379/265.09 |
| 6,535,600 B1 | * | 3/2003 | Fisher et al. ............ | 379/265.12 |
| 6,556,659 B1 | * | 4/2003 | Bowman-Amuah ........ | 379/9.04 |

* cited by examiner

*Primary Examiner*—Roland Foster
*Assistant Examiner*—Shafiul Alam Elahee
(74) *Attorney, Agent, or Firm*—Brooks Kushman P.C.

(57) ABSTRACT

A call center system for enabling communication between callers and subscribers. The call center system includes a public switched telephone network (PSTN) and a virtual call center operable to receive calls from callers via the PSTN. The virtual call center performs Interactive Voice Response (IVR) and Automated Call Distributor (ACD) functions to the callers on behalf of subscribers of the virtual call center for enabling communication between the callers and the subscribers. The virtual call center performs IVR and ACD functions to callers on behalf of each subscriber based on a service level agreement between each subscriber and the virtual call center. The virtual call center performs IVR functions associated with a subscriber for a caller to access information from the subscriber and for a caller to provide information to the subscriber. The virtual call center performs ACD functions associated with the subscriber to connect the caller with an agent of the subscriber.

24 Claims, 2 Drawing Sheets

MULTI-TENANT, MULTI-MEDIA CALL CENTER SERVICES PLATFORM SYSTEM

CROSS-REFERENCE TO RELATED APPLICATIONS

This application claims the benefit of U.S. provisional application Ser. No. 60/215,173 filed Jun. 30, 2000.

TECHNICAL FIELD

The present invention relates generally to telecommunications call center technologies and, more particularly, to a system for supporting multiple organization subscribers to network based interactive voice response (IVR), automated call distributor (ACD), and related call center technologies deployed on a common platform having seamless interfaces to switched circuit and Internet Protocol (IP) networks.

BACKGROUND ART

Telecommunications call center technologies include an interactive voice response (IVR) unit and an automated call distributor (ACD) for enabling communications between a caller and an organization. An IVR automates telephone based "self help" tasks by giving a caller access to information and by receiving information from the caller. An IVR allows communication between the caller and the organization without having the caller directly communicate with a human agent of the organization. By automating the retrieval and processing of information for a caller having access to a telephone or personal computer (PC) an IVR gives data a voice and adds intelligence to a telephone call from the caller. An IVR uses recordings of human or computerized voice to communicate to callers on behalf of an organization. For instance, an IVR for an organization such as a bank would have recordings for communicating with a caller such as "Thank you for calling the bank. Push one on your touch tone telephone for savings account information. Push two on your touch tone telephone for checking account information." In response, a caller communicates with the IVR to select the appropriate response by pressing the appropriate number on a touch tone telephone or PC. Based on the callers response, the IVR uses recordings to present different menus to the caller and the caller presses the appropriate numbers on the touch tone telephone or PC to work through the menus to obtain the desired information. An IVR may be automated speech recognition (ASR) enabled to allow the caller to speak a response rather than manipulate a key pad on a touch tone telephone or PC. In general, an IVR allows the caller to access information in the organization's database and to receive that information either verbally via a touch tone telephone through a telephone network such as the public switched telephone network (PSTN) or on a PC via an Internet Protocol (IP) data network such as the Internet.

An ACD distributes incoming calls from callers to agents of an organization to enable the callers to speak directly with the agents. In operation, an ACD recognizes and answers an incoming call from a caller, looks in a database for instructions on what to do with the call, based on the instructions the ACD sends the call to a recording such as "Your call is being transferred to the next available agent", and then transfers the caller to an agent for the caller to speak directly with the agent. The ACD may take information from the caller and pass this information to the agent to speed the communication between the caller and the agent. The ACD may also select an agent for the caller based on the information submitted by the caller to ensure that the appropriate agent communicates with the caller.

A problem with typical telecommunications call center technologies such as IVR and ACD is that organizations set up and maintain their own call centers. This is expensive and inefficient as each organization deploys and maintains separate call centers. What is needed is a system for supporting multiple organization subscribers to network based IVR, ACD, and related call center technologies deployed on a common platform having seamless interfaces to switched circuit and Internet Protocol (IP) networks.

SUMMARY OF THE INVENTION

Accordingly, it is an object of the present invention to provide a system for supporting multiple subscribers to network based call center technologies deployed on a common platform.

It is another object of the present invention to provide a system for supporting multiple subscribers to a network based Interactive Voice Response (IVR) unit.

It is a further object of the present invention to provide a system for supporting multiple subscribers to a network based Automated Call Distributor (ACD).

In carrying out the above objects and other objects, the present invention provides a call center system for enabling communication between callers and subscribers. The system includes a public switched telephone network (PSTN) and a virtual call center operable to receive calls from callers via the PSTN. The virtual call center performs Interactive Voice Response (IVR) and Automated Call Distributor (ACD) functions to the callers on behalf of subscribers of the virtual call center for enabling communication between the callers and the subscribers. The virtual call center performs IVR and ACD functions to callers on behalf of each subscriber based on a service level agreement between each subscriber and the virtual call center. The virtual call center performs IVR functions associated with a subscriber for a caller to access information from the subscriber and to provide information to the subscriber. The virtual call center performs ACD functions associated with the subscriber to connect the caller with an agent of the subscriber.

Preferably, the system includes a service level agreement database operable with the virtual call center for storing the service level agreement of each subscriber with the virtual call center. The system may include a local database operable with the virtual call center for storing rules for the IVR and ACD functions of each subscriber. The virtual call center performs the IVR and ACD functions to the callers on behalf of the subscribers based on the rules of the IVR and ACD functions.

Preferably, a remote database is operable with the virtual call center for storing information regarding each subscriber. The virtual call center performs IVR functions associated with each subscriber for a caller to access information regarding a subscriber from the remote database. The remote database is operable with the virtual call center for storing information provided by the caller to the subscriber.

Preferably, the virtual call center includes a call management unit, a multi-tenant framework, a voice response unit, an applications server, and data network interfaces. The call management unit has telephony ports for enabling connection of calls from the PSTN made by callers to the virtual call center for enabling communication between the callers and the subscribers. The call management unit connects a call from the PSTN made by a caller to the virtual call center by allocating a telephony port to the call. The availability of the telephony ports of the call management unit for calls made by callers to a subscriber is based on the service level agreement of the subscriber with the virtual call center.

The voice response unit is operable for playing voice recordings to the callers on behalf of a subscriber for providing information to the caller regarding the subscriber. The voice response unit receives information from the caller in response to the caller responding to the voice recordings.

The call management unit forwards to the multi-tenant framework access information regarding the caller and the multi-tenant framework uses the access information to identify the subscriber whom the caller is calling. The multi-tenant framework compares the service level agreement of the subscriber whom the caller is calling to the current use of the call management unit by the subscriber to determine whether to instruct the call management unit to accept or reject the call from the caller to the subscriber. The access information regarding the caller may include automatic number identification (ANI) information and dialed number identification service (DNIS) information.

The multi-tenant framework forwards information regarding the caller to the applications server. The applications server performs IVR and ACD functions to the caller on behalf of a subscriber based on the service level agreement of the subscriber with the virtual call center. The application server directs the voice response unit to play recordings of the subscriber to the caller for interacting with the caller.

Preferably, the system further includes a data network. The virtual call center further includes data network interfaces for connecting the virtual call center to the data network. A computer telephone integration (CTI) router is connected to the data network. The CTI router contains information about agent skills and status for each subscriber. The applications server forwards information regarding the caller to the CTI router. The CTI router returns a routing instruction to the applications server in response to receiving the information regarding the caller. The routing instruction includes an address of an agent of the subscriber for handling the call from the caller. The CTI router determines an agent of the subscriber for handling the call based on the information regarding the caller and the information regarding agent skills and status. Upon receiving the routing instruction from the CTI router the applications server instructs the call management unit to transfer the call from the caller to the address returned in the routing instruction for connecting the caller to the agent of the subscriber.

Preferably, a transaction log database is operable with the virtual call center for monitoring usage of IVR and ACD functions performed by the virtual call center to the callers on behalf of the subscribers.

Preferably, the virtual call center is operable for connecting the caller to an Internet Service Provider (ISP) through a data network and the PSTN in accordance with the service level agreement of the subscriber whom the caller is calling. The virtual call center is operable for connecting the caller to the ISP through a data network and the PSTN to provide voice over Internet Protocol (VoIP) connectivity between the caller and an agent of the subscriber.

The advantages of the system of the present invention include providing a means for small and medium sized businesses to subscribe to call center systems rather than bearing the expense of deploying, managing, and maintaining local call center systems; providing a means for seasonal and special event businesses to subscribe to excess call center system capacities rather than over engineer their local call center systems around peak usage; providing a means for multi-site businesses to balance their call center system applications across sites such that agents at any site can access common call center system functionality through telephones and PCs; providing a means for Internet Service Providers (ISPs) to offer high speed access to their servers across data network facilities; providing a means for ISPs to offer real time or scheduled agent collaboration for web site sales; providing a means for provisioning, managing, and maintaining each subscriber as an independent entity on a common platform and charging each subscriber based on measured usage of platform components; providing a means for subscribers to manage remotely certain run time options defined in service agreements; and providing a means for allowing each subscriber to view, manipulate, and draft reports upon only their data.

The above objects and other objects, features, and advantages of the present invention will be apparent from the following detailed description of the best mode for carrying out the invention when taken in connection with the accompanying drawings.

BEST MODE FOR CARRYING OUT THE INVENTION

Figure 1:
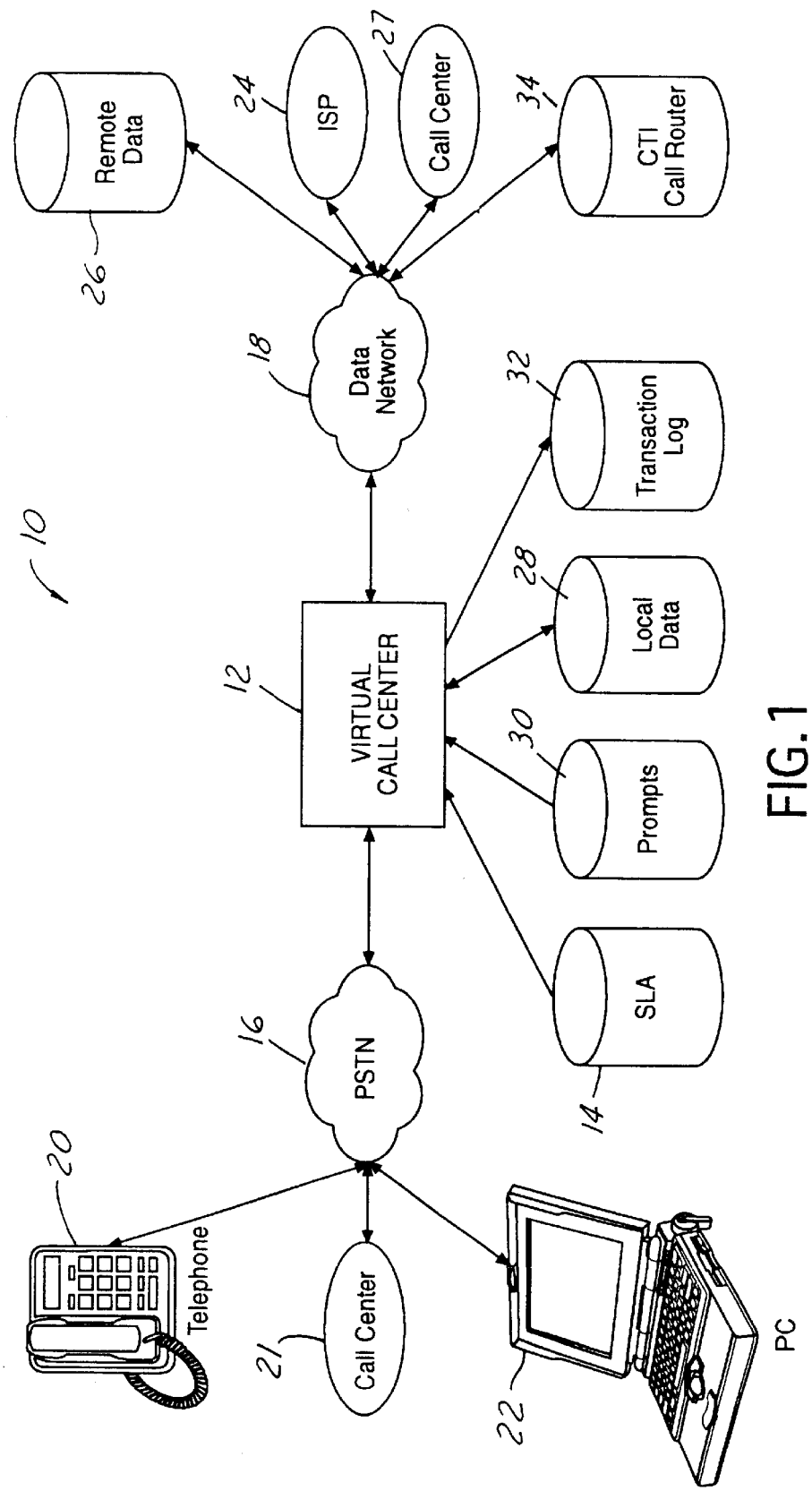
FIG. 1 illustrates a system for supporting multiple subscribers to network based Interactive Voice Response (IVR), Automated Call Distributor (ACD), and related call center technologies deployed on a common platform in accordance with the present invention.

Referring now to FIG. 1, a system 10 for supporting multiple subscribers to network based Interactive Voice Response (IVR), Automated Call Distributor (ACD), and related call center technologies deployed on a common platform in accordance with the present invention is shown. System 10 includes a virtual call center 12 for providing IVR and ACD services to multiple organization subscribers. Virtual call center 12 is deployed within a general data network or "cloud" for access by multiple subscribers and callers. Virtual call center 12 enables callers and subscribers to communicate using common IVR and ACD elements. Each subscriber subscribes with virtual call center 12 to use a given amount of IVR and ACD resources and applications provided by virtual call center 12. The amount of resources and the type of applications for each subscriber to use varies as a function of the subscriber's service level agreement with virtual call center 12.

A service level agreement database 14 operable with virtual call center 12 stores the service level agreement for each subscriber. A local database 28 operable with virtual call center 12 stores the structure and rules for the IVR and ACD applications of each subscriber. From the point of view of the callers and the subscriber, virtual call center 12 generally functions as if the subscriber had their own virtual call center. In reality, virtual call center 12 is a platform common to multiple subscribers and the callers of the subscribers.

Virtual call center 12 provides seamless interfaces to a switched circuit network such as the public switched telephone network (PSTN) 16 and a data network such as an Internet Protocol (IP) network 18 for subscribers and callers to communicate. In operation, a caller uses a touch tone telephone 20 or a personal computer (PC) 22 to connect with virtual call center 12 via PSTN 16. The caller connects with virtual call center 12 to communicate with one of the subscribers. Virtual call center 12 performs IVR and ACD functions on behalf of a subscriber to enable communication between the subscriber and the caller through PSTN 16 or data network 18.

Virtual call center 12 performs IVR functions associated with the subscriber such that the caller can gain access to information from the subscriber and provide information to the subscriber without directly talking to an agent of the subscriber. Virtual call center 12 accesses local database 28 to access and perform the IVR functions to the caller on behalf of the subscriber. Virtual call center 12 appears to the caller as the IVR of the subscriber by allowing the caller to access information from a remote database 26 associated with the subscriber by pressing the keypad of touch tone telephone 20 or PC 22. Virtual call center 12 accesses remote database 26 via data network 18. Virtual call center 12 presents recordings of menus associated with the subscriber to the caller to provide desired information to the caller from the subscriber through PSTN 16. A prompts database 30 operable with virtual call center 12 stores the recordings for the virtual call center to perform the IVR functions. Virtual call center 12 also records IVR input from the caller to transfer information from the caller to remote database 26 or by speaking responses directly.

A transaction log database 32 operable with virtual call center 12 monitors and measures the usage of IVR and ACD resources and applications of virtual call center 12 in handling the call from the caller to the subscriber. If the call is for an Internet connection, virtual call center 12 connects the caller to an appropriate Internet Service Provider (ISP) 24 though data network 18 and PSTN 16.

Similarly, virtual call center 12 performs ACD functions associated with the subscriber to connect the caller with a human agent of the subscriber. Virtual call center 12 accesses local database 28 to access and perform the ACD functions on behalf of the subscriber. Virtual call center 12 appears to the caller as the ACD of the subscriber by connecting the caller with an agent of the subscriber through PSTN 16 or through the PSTN and data network 18. Virtual call center 12 answers an incoming call from a caller to the subscriber, looks in local database 28 associated with the subscriber for instructions on what to do with the call, and connects the caller to an agent for the caller to speak directly with the agent. The callers are connected to subscriber call centers 21, 27 to be connected with the agents. The agents of the subscriber use subscriber call centers 21, 27 to communicate with the callers via virtual call center 12 and to communicate with the virtual call center itself.

To connect the caller to an agent virtual call center 12 transfers a routing request to a computer telephone integration (CTI) call router 34. Virtual call center 12 provides information regarding the caller to CTI call router 34. The information may include what telephone number the caller called and where the caller is calling from. Based on the information regarding the caller, CTI call router 34 provides routing instructions to virtual call center 12 on how to connect the caller to an agent of the subscriber. CTI router 12 includes routing information of each subscriber containing information about agent skills and status of the subscriber. The routing instructions include which agent virtual call center 12 should connect to the caller. The routing instructions also include the address of the agent for virtual call center 12 to locate the agent at the appropriate subscriber call center 21, 27 to enable the connection between the caller and the agent.

Figure 2:
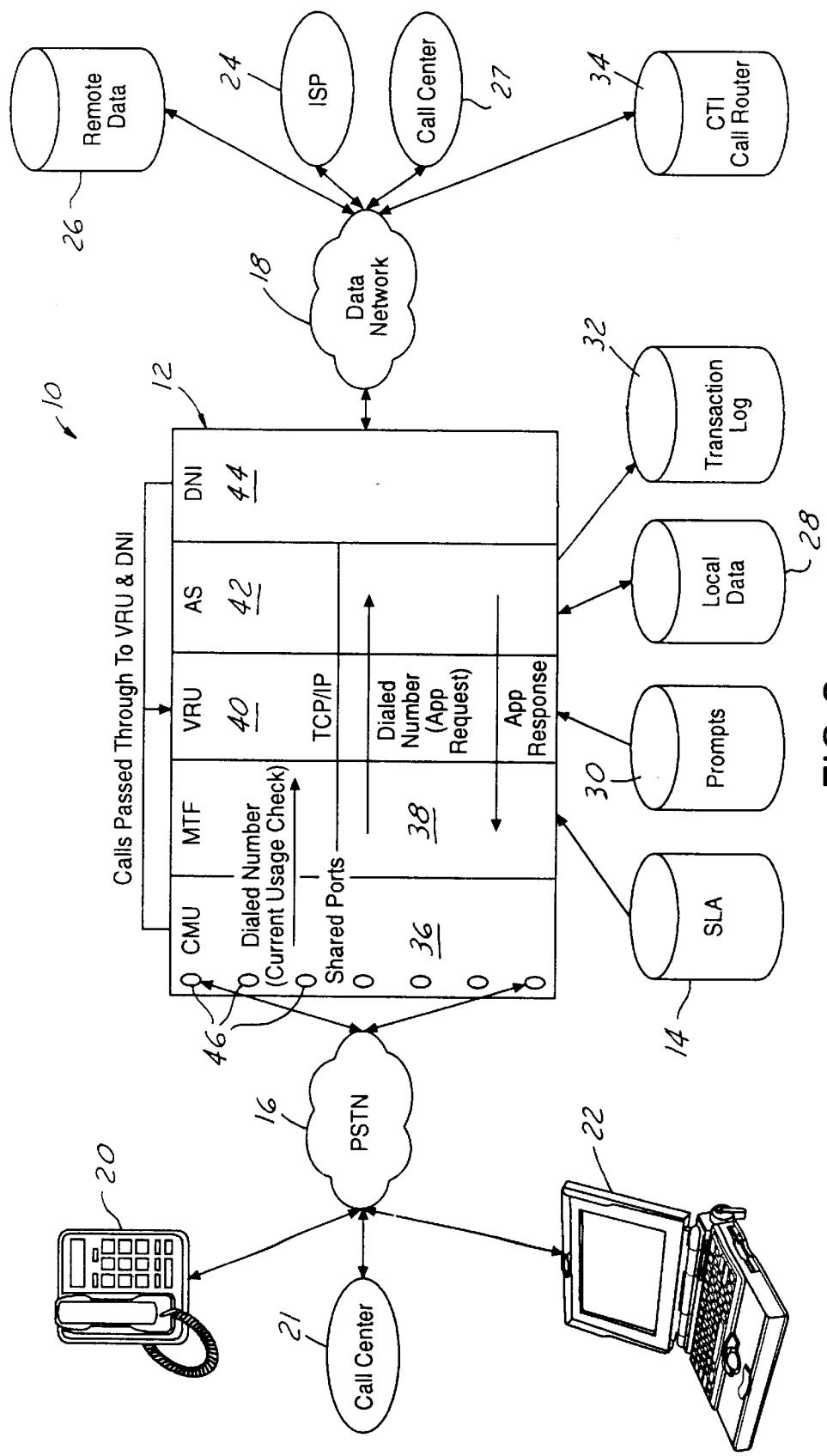
FIG. 2 illustrates in greater detail the virtual call center of the system shown in FIG. 1.

Referring now to FIG. 2, with continual reference to system 10 shown in FIG. 1, the operation and structure of virtual call center 12 will be described in greater detail. In general, virtual call center 12 includes IVR and ACD platforms with industry standard CTI links between themselves and other network or CPE based entities which provide information specific to a particular network plan or subscriber site. Virtual call center 12 includes a call management unit (CMU) 36, a multi-tenant framework (MTF) 38, a voice response unit (VRU) 40, an applications server (AS) 42, and data network interfaces (DNI) 44.

CMU 36 is a rack containing a processor and standard telephony ports 46. Telephony ports 46 connect with PSTN 16 to enable a connection between a caller and virtual call center 12, between an agent of the subscriber at one of subscriber call centers 21, 27, and between the subscriber call center 21 and the virtual call center. Telephony ports 46 are addressable through application programming interface (API). CMU 36 is the front end of the IVR and ACD platforms. For IVR and ACD functions, CMU 36 generally answers and rejects calls from callers and performs call transfers. For ACD functions, CMU 36 further bridges connected calls from callers to agents of the subscribers. CMU 36 answers a call from a caller by allocating a telephony port 46 to the caller and rejects calls from callers by refusing the callers access to the telephony ports. CMU 36 performs a call transfer by connecting a caller to the desired call transfer location through a telephony port 46. CMU 36 bridges a call from a caller to an agent at one of the subscriber call centers 21, 27 through a telephony port 46.

The availability of telephony ports 46 of CMU 36 for each subscriber is a function of the service level agreement of the subscriber with virtual call center 12. If one of the telephony ports 46 assigned to a subscriber is open and not being used then when a caller calls the subscriber CMU 36 accepts the call. If all of the telephony ports 46 assigned to a subscriber are being used then when a new caller calls the subscriber CMU 36 may reject the call.

VRU 40 is a rack containing a processor and is operable with prompts database 30 for playing recordings to the callers on behalf of the subscribers. In response to the recordings played by VRU 40 the caller makes an appropriate response to provide information to the VRU. VRU 40 accepts either dual tone multi-frequency (DTMF) or natural speech responses from the caller. VRU 40 plays the appropriate recordings based on the input from the caller.

When calls are offered to CMU 36 by a central office within PSTN 16 the CMU forwards any network provided access information regarding the caller to MTF 38. The network provided access information may include caller information such as automatic number identification (ANI) and dialed number identification service (DNIS). ANI provides information regarding the telephone number the caller is calling from. DNIS provides information regarding the telephone number the caller called.

MTF 38 is also a rack containing a processor. MTF 38 uses the network access information provided by CMU 36 to identify the subscriber owning the call from the caller. MTF 38 then returns an instruction to CMU 36 to accept or reject the call based on the service level agreement for that subscriber. MTF 38 compares the service level agreement of the subscriber with the current use of CMU 36 by that subscriber for handling other calls to make the determination upon whether the CMU should accept or reject the current call. If the subscriber is not operating at maximum capacity then the call will be accepted by CMU 36. If the subscriber is operating at maximum capacity then the call will be rejected by CMU 36. For rejected calls, MTF 38 may instruct VRU 40 to play a recording notifying the caller that the call will not be accepted because all lines are busy. MTF 38 may also provide a busy signal to the caller to indicate to the caller that call cannot get through at this time. Depending on the service level agreement of the subscriber owning the call MTF 38 may perform other functions such as ensuring that the information from the caller is stored so that the subscriber may use it later to call back the caller.

If the call can be answered by CMU 46, then MTF 38 forwards the information regarding the caller and subscriber to AS 42. AS 42 is also a processor which is operable to invoke applications on behalf of the subscriber based on the service level agreement of the subscriber. For IVR functions, AS 42 performs applications such as call screening, self help, and call parking applications specific to that subscriber. For ACD functions, AS 42 performs applications such as call screening, self navigation, intelligent routing, and call queuing applications specific to that subscriber. If an interaction with the caller is required, AS 42 directs VRU 40 to play that subscribers recordings and collect responses from the caller.

AS 42 has CTI links through data network interfaces 44 and data network 18 to platform based call routing devices such as CTI router 34. If the call requires a human agent of the subscriber, AS 42 sends information gathered about the nature of the call across data network interfaces 44 to CTI router 34 with a request for a routing instruction. As described above, CTI router 34 contains information about agent skills and status for each subscriber. The information about agent skills and status is derived in real time from that subscribers presence on the ACD platform. In response to the routing request and information provided by AS 42 regarding the nature of the call and the current availability of an appropriate agent, CTI router 34 returns a routing instruction to the AS via data network 18 and data network interfaces 44. The routing instruction is a network or telephone address of an agent of the subscriber that is to handle the call from the caller. Upon receiving the routing instruction from CTI router 34, AS 42 instructs CMU 36 to transfer the call to the address returned in the routing instruction. AS 42 then drops its connection to the call once the call from the caller has been connected to the subscriber agent, private branch exchange (PBX), or ACD.

AS 42 may also request information on subscriber call centers 21, 27 to make a determination as to where a call should be routed. This routing criteria may include regional traffic for a multiple site subscriber, site traffic for a single location, specific agent skills, and availability within any site. If a subscriber call center 21, 27 is busy, CTI call router 34 may request that virtual call center 12 send the call to an alternate call center site instead. At a particular subscriber call center 21, 27, all agents and all queues may be busy. In this case, CTI router 34 may request virtual call center 12 to send the call to a holding platform in the network and then deliver the call when the CTI router instructs the virtual call center that the call can now be completed to the local site.

Agents of the subscriber can log into the ACD platform of virtual call center 12 over dial up connections from any location. The number of agents allowed to be logged on at any one time is controlled by MTF 38 as previously described. Callers are bridged on to the agents connection by CMU 36 and any information gathered regarding the calls may be delivered across data network interfaces 44 and data network 18 to desktops of the agents in the form of a screen pop. Agents may have all of the platform desktop resources available for processing calls, wrapping up, and updating caller data regardless of their location. Agents can transfer calls manually or use automated features on AS 42 which will instruct CMU 36 to transfer the call to a number or address returned from a routing request to that subscribers routing device residing on CTI router 34.

If the call is for an Internet connection, AS 42 connects the call to an appropriate ISP 24 via data network interfaces 44 and data network 18 in accordance with the service level agreement of the subscriber. The call is connected through virtual call center 12 using Transmission Control Protocol/Internet Protocol (TCP/IP). If the caller chooses to invoke any of the live agent help options of the subscriber while connected to a web site of the subscriber through ISP 24, AS 42 may open an Intranet connection across data network interfaces 44 to provide Voice over Internet Protocol (VoIP) connectivity to one of the agents of the subscriber and add the agent to the callers Internet session. Voice over Frame Relay (VoFR), Voice over Asynchronous Transfer Mode (VoATM), and other packetized or cell related voice channel and data transport technologies are also supported by virtual call center 12 to connect the callers and the agents. If the caller chooses to invoke any of the subscribers call back options while at the web site of the subscriber, AS 42 may schedule the request and pass the scheduling information to an agent management system of the subscriber.

During operation of virtual call center 12, MTF 38 segments each subscriber from each other such that each subscribers data are secured. MTF 38 provides interfaces for the data network provider of virtual call center 12 to provision, manage, and maintain each subscriber's service without affecting any services of the other subscribers. MTF 38 provides interfaces for each subscriber to manage and maintain their service without effecting the service of any other subscriber. MTF 38 generates call detail records by subscriber for the amount of time each call was resident on virtual call center 12 and which applications were invoked. MTF 38 provides the call detail records to transaction log 32.

Thus, it is apparent that there has been provided, in accordance with the present invention, a system for supporting multiple subscribers to network based IVR, ACD, and related call center technologies deployed on common platforms having seamless interfaces to switched circuit and IP networks that fully satisfy the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A call center system for enabling communication between callers and subscribers, the system comprising:

a public switched telephone network (PSTN); and a virtual call center shared by subscribers in accordance with service level agreements between the subscribers and the virtual call center, the virtual call center being operable to receive calls from callers via the PSTN, the virtual call center performing Interactive Voice Response (IVR) and Automated Call Distributor (ACD) functions to the callers on behalf of the subscribers of the virtual call center for enabling communication between the callers and the subscribers, wherein the virtual call center performs IVR and ACD functions to callers on behalf of each subscriber based on a service level agreement between each subscriber and the virtual call center;

wherein the virtual call center performs IVR functions associated with a subscriber for a caller to access information from the subscriber and for a caller to provide information to the subscriber, wherein the virtual call center performs ACD functions associated with a subscriber to connect a caller with an agent of the subscriber;

wherein the virtual call center includes a call management unit having telephony ports for enabling connection of calls from the PSTN made by callers to the virtual call center for enabling communication between the callers and the subscribers, wherein the call management unit connects a call from the PSTN made by a caller to the virtual call center by allocating a telephony port to the call, wherein the availability of the telephony ports of the call management unit for calls made by callers to a subscriber is based on the service level agreement of the subscriber with the virtual call center.

2. The system of claim 1 further comprising:
a service level agreement database operable with virtual call center for storing the service level agreement of each subscriber with the virtual call center.

3. The system of claim 1 further comprising:
a local database operable with the virtual call center for storing rules for the IVR and ACD functions of each subscriber, wherein the virtual call center performs the IVR and ACD functions to the callers on behalf of the subscribers based on the rules of the IVR and ACD functions.

4. The system of claim 1 further comprising:
a remote database operable with the virtual call center for storing information regarding each subscriber, wherein the virtual call center performs IVR functions associated with each subscriber for a caller to access information regarding a subscriber from the remote database.

5. The system of claim 1 further comprising:
a remote database operable with the virtual call center for storing information provided by the caller to the subscriber.

6. The system of claim 1 wherein:
the virtual call center includes a call management unit, a multi-tenant framework, a voice response unit, an applications server, and data network interfaces.

7. The system of claim 1 wherein:
the virtual call center further includes a voice response unit operable for playing voice recordings to the callers on behalf of a subscriber for providing information to the caller regarding the subscriber.

8. The system of claim 7 wherein:
the voice response unit receives information from the caller in response to the caller responding to the voice recordings.

9. The system of claim 1 further comprising:
a transaction log database operable with the virtual call center for monitoring usage of IVR and ACD functions performed by the virtual call center to the callers on behalf of the subscribers.

10. The system of claim 1 wherein:
the virtual call center is operable for connecting the caller to an Internet Service Provider (ISP) through a data network and the PSTN in accordance with the service level agreement of the subscriber whom the caller is calling.

11. The system of claim 10 wherein:
the virtual call center is operable for connecting the caller to the ISP through data network and the PSTN to provide voice over Internet Protocol (VoIP) connectivity between the caller and an agent of the subscriber.

12. A call center system for enabling communication between callers and subscribers, the system comprising:
a public switched telephone network (PSTN); and
a virtual call center shared by subscribers in accordance with service level agreements between the subscribers and the virtual call center, the virtual call center being operable to receive calls from callers via the PSTN, the virtual call center performing Interactive Voice Response (IVR) and Automated Call Distributor (ACD) functions to the callers on behalf of the subscribers of the virtual call center for enabling communication between the callers and the subscribers, wherein the virtual call center performs IVR and ACD functions to callers on behalf of each subscriber based on a service level agreement between each subscriber and the virtual call center;

wherein the virtual call center includes a call management unit having telephony ports for enabling connection of calls from the PSTN made by callers to the virtual call center for enabling communication between the callers and the subscribers, wherein the call management unit connects a call from the PSTN made by a caller to the virtual call center by allocating a telephony port to the call, wherein the availability of the telephony ports of the call management unit for calls made by callers to a subscriber is based on the service level agreement of the subscriber with the virtual call center;

wherein the virtual call center further includes a voice response unit operable for playing voice recordings to the callers on behalf of a subscriber for providing information to the caller regarding the subscriber;

wherein the virtual call center further includes a multi-tenant framework, wherein the call management unit forwards to the multi-tenant framework access information regarding the caller, wherein the multi-tenant framework uses the access information to identify the subscriber whom the caller is calling.

13. The system of claim 12 wherein:
the virtual call center performs IVR functions associated with a subscriber for a caller to access information from the subscriber.

14. The system of claim 12 wherein:
the virtual call center performs IVR functions associated with a subscriber for a caller to provide information to the subscriber.

15. The system of claim 12 wherein:
the virtual call center performs ACD functions associated with the subscriber to connect the caller with an agent of the subscriber.

16. The system of claim 12 wherein:
the access information regarding the caller includes automatic number identification (ANI) information.

17. The system of claim 12 wherein:
the access information regarding the caller includes dialed number identification service (DNIS) information.

18. A call center system for enabling communication between callers and subscribers, the system comprising:
a public switched telephone network (PSTN); and
a virtual call center shared by subscribers in accordance with service level agreements between the subscribers and the virtual call center, the virtual call center being operable to receive calls from callers via the PSTN, the virtual call center performing Interactive Voice Response (IVR) and Automated Call Distributor (ACD) functions to the callers on behalf of the subscribers of the virtual call center for enabling communication between the callers and the subscribers, wherein the virtual call center performs IVR and ACD functions to callers on behalf of each subscriber based on a service level agreement between each subscriber and the virtual call center;

wherein the virtual call center includes a call management unit having telephony ports for enabling connection of calls from the PSTN made by callers to the virtual call center for enabling communication between the callers and the subscribers;

wherein the virtual call center further includes a voice response unit operable for playing voice recordings to the callers on behalf of a subscriber for providing information to the caller regarding the subscriber;

wherein the virtual call center further includes a multi-tenant framework, wherein the call management unit forwards to the multi-tenant framework access information regarding the caller, wherein the multi-tenant framework uses the access information to identify the subscriber whom the caller is calling, wherein the multi-tenant framework compares the service level agreement of the subscriber whom the caller is calling to the current use of the call management unit by the subscriber to determine whether to instruct the call management unit to accept or reject the call from the caller to the subscriber.

19. The system of claim 18 wherein:

the virtual call center further includes an applications server, wherein the multi-tenant framework forwards information regarding the caller to the applications server, wherein the applications server performs IVR and ACD functions to the caller on behalf of a subscriber based on the service level agreement of the subscriber with the virtual call center.

20. The system of claim 19 wherein:

the application server directs the voice response unit to play recordings of the subscriber to the caller for interacting with the caller.

21. The system of claim 19 further comprising:

a data network;

wherein the virtual call center further includes data network interfaces for connecting the virtual call center to the data network.

22. The system of claim 21 further comprising:

a computer telephone integration (CTI) router connected to the data network, the CTI router containing information about agent skills and status for each subscriber, wherein the applications server forwards information regarding the caller to the CTI router, wherein the CTI router returns a routing instruction to the applications server in response to receiving the information regarding the caller, wherein the routing instruction includes an address of an agent of the subscriber for handling the call from the caller.

23. The system of claim 22 wherein:

wherein the CTI router determines an agent of the subscriber for handling the call based on the information regarding the caller and the information regarding agent skills and status.

24. The system of claim 23 wherein:

upon receiving the routing instruction from the CTI router the applications server instructs the call management unit to transfer the call from the caller to the address returned in the routing instruction for connecting the caller to the agent of the subscriber.

* * * * *